United States Patent
Ergun et al.

(10) Patent No.: US 12,256,754 B2
(45) Date of Patent: *Mar. 25, 2025

(54) SOLID COMPOSITION CONTAINING OLEOGEL

(71) Applicant: NUTRITION & BIOSCIENCES USA 1, LLC, Rochester, NY (US)

(72) Inventors: Roja Ergun, Midland, MI (US); Asim Syed, Midland, MI (US); Anne Adden, Bomlitz (DE)

(73) Assignee: NUTRITION & BIOSCIENCES USA 1, LLC, Wilmington, DE (US)

( * ) Notice: Subject to any disclaimer, the term of this patent is extended or adjusted under 35 U.S.C. 154(b) by 926 days.

This patent is subject to a terminal disclaimer.

(21) Appl. No.: 16/335,956

(22) PCT Filed: Sep. 14, 2017

(86) PCT No.: PCT/US2017/051487
§ 371 (c)(1),
(2) Date: Mar. 22, 2019

(87) PCT Pub. No.: WO2018/057383
PCT Pub. Date: Mar. 29, 2018

(65) Prior Publication Data
US 2019/0307145 A1    Oct. 10, 2019

Related U.S. Application Data

(60) Provisional application No. 62/398,582, filed on Sep. 23, 2016.

(51) Int. Cl.
| | | |
|---|---|---|
| *A23D 9/007* | (2006.01) |
| *A21D 2/16* | (2006.01) |
| *A21D 2/18* | (2006.01) |
| *A21D 13/16* | (2017.01) |
| *A23D 7/005* | (2006.01) |

(52) U.S. Cl.
CPC .............. *A23D 9/007* (2013.01); *A21D 2/165* (2013.01); *A21D 2/188* (2013.01); *A21D 13/16* (2017.01); *A23D 7/005* (2013.01)

(58) Field of Classification Search
None
See application file for complete search history.

(56) References Cited

U.S. PATENT DOCUMENTS

| | | |
|---|---|---|
| 6,391,928 B1 | 5/2002 | Rajasekharan et al. |
| 8,940,354 B2 * | 1/2015 | Marangoni ............. A23G 1/54 426/601 |
| 2012/0100251 A1 | 4/2012 | Baseeth et al. |
| 2012/0183651 A1 * | 7/2012 | Marangoni ............ A23D 9/007 426/93 |
| 2014/0044839 A1 | 2/2014 | Cattaruzza et al. |
| 2015/0157038 A1 * | 6/2015 | Ergun .................... A21D 2/165 426/573 |
| 2016/0021898 A1 | 1/2016 | Ergun et al. |
| 2016/0021905 A1 * | 1/2016 | Marangoni .......... C09K 23/017 426/602 |

FOREIGN PATENT DOCUMENTS

| | | |
|---|---|---|
| JP | S57-151668 A | 9/1982 |
| WO | WO-2010/143066 A1 | 12/2010 |
| WO | WO-2014/004018 A1 | 1/2014 |
| WO | WO-2014/172135 A1 | 10/2014 |

OTHER PUBLICATIONS

Daniel, E. and Marangoni, A.G., Organogels: An Alternative Edible Oil-Structuring Method. J Am Oil Chem Soc. 2012; 89: 749-80.
Kaushik, I et al., Organogelation: It's Food Application. MOJ Food Process Technol. 2017; 4(2):00089 (8 pages).
Schaink, H.M. et al., Crystal Network for Edible Oil Organogels: Possibilities and Limitations of the Fatty Acid and Fatty Alcohol Systems. Food Res Int. 2007; 40:1185-93.
Stortz, T.A. et al., Edible Oleogels in Food Products to Help Maximize Health Benefits and Improve Nutritional Profiles. Lipid Technol. 2012; 24(7):151-4.

* cited by examiner

*Primary Examiner* — Lien T Tran

(57) ABSTRACT

Provided is a composition that is solid at 23° C. comprising, by weight based on the weight of the composition, (a) 0.4% to 12% one or more ethylcellulose polymers; (b) 0.5% to 8% stearic acid; (c) 15% to 90% one or more unsaturated oils; and (d) 6% to 70% one or more saturated fats. Also provided is a method of making a baked pastry composition comprising vertically compressing a structure (i) comprising a horizontal top layer, a horizontal intermediate layer, and a horizontal bottom layer, to reduce the thickness of the structure and produce a compressed structure (ii), wherein the top layer comprises dough, the intermediate layer comprises the above composition, and the bottom layer comprises dough. Also provided is a pastry composition comprising, by weight based on the weight of the pastry composition, ethylcellulose polymer, stearic acid, unsaturated oil, flour, and water.

3 Claims, No Drawings

SOLID COMPOSITION CONTAINING OLEOGEL

CROSS-REFERENCE TO RELATED APPLICATIONS

This application is a U.S. National Phase Application of International Application No. PCT/US2017/051487, filed Sep. 14, 2017, which claims the benefit of U.S. Provisional Application No. 62/398,582, filed Sep. 23, 2016, all of which applications are hereby incorporated by reference in their entireties.

Fats that are solid at room temperature (23° C.) have been used in various food products for many years. Desirable food products that contain fat that is solid at room temperature include, for example, butter and margarine. Most solid fats contain an undesirably high proportion of saturated fats (like, for example butter) and/or trans fats (like, for example, many margarines). It is thought that consumption of saturated fats and/or trans fats raises the level of blood LDL cholesterol and increases the risk of heart disease and stroke. Thus it is desirable to replace some or all of the saturated fats and/or trans fats with unsaturated fats, which have various nutritional benefits. A common source of unsaturated fats is unsaturated oils such as vegetable oils, but these oils are typically liquid at room temperature or have melting points not far above room temperature. Simply replacing solid fat with liquid oil usually causes undesirable changes in the texture of the food product. For example, replacing butter or margarine with liquid oil is undesirable because the solid nature of the butter or margarine at room temperature would be lost. It is desirable to replace some or all of the solid fat with a composition that is solid at room temperature and that contains a high proportion of unsaturated oil. It is also desirable that the composition that contains unsaturated oil does not have too much firmness at room temperature, because too much firmness would prevent the composition from being able to be spread onto a substrate in the way that butter and margarine are spreadable.

One common use for butter and margarine is as an ingredient in a pastry composition. It is desired to provide a composition containing unsaturated oil that performs acceptably as a substitute for margarine in making a pastry composition.

One approach to the problem of providing a solid composition that contains unsaturated oil has been the use of ethylcellulose oleogels, which are blends that contain unsaturated oil and a relatively small amount of ethylcellulose polymer. Ethylcellulose oleogels are solid at room temperature. WO 2010/143066 describes oleogels that contain ethylcellulose polymer, oil, and surfactant. It is desired to provide compositions that are solid, but preferably not too firm, at room temperature, and that contain a high proportion of unsaturated oil.

The following is a statement of the invention.

A first aspect of the present invention is a composition that is solid at 23° C. comprising, by weight based on the weight of the composition,
   (a) 0.4% to 12% one or more ethylcellulose polymers;
   (b) 0.5% to 8% stearic acid;
   (c) 15% to 90% one or more unsaturated oils; and
   (d) 6% to 70% one or more saturated fats.

A second aspect of the present invention is a method of making a pastry composition comprising vertically compressing a structure (i) comprising a horizontal top layer, a horizontal intermediate layer, and a horizontal bottom layer, to reduce the thickness of the structure and produce a compressed structure (ii), wherein the top layer comprises dough, the intermediate layer comprises the composition of the first aspect of the present invention, and the bottom layer comprises dough.

A third aspect of the present invention is a baked pastry composition comprising, by weight based on the weight of the pastry composition,
   (A) 0.2% to 2.5% one or more ethylcellulose polymers,
   (B) 0.25% to 4% stearic acid,
   (C) 6% to 70% one or more unsaturated oils,
   (D) 3.5% to 50% one or more saturated fats,
   (E) 10% to 90% one or more flour, and
   (F) 0% to 5% water.

The following is a detailed description of the invention.

As used herein, the following terms have the designated definitions, unless the context clearly indicates otherwise.

Ethylcellulose polymer, as used herein, means a derivative of cellulose in which some of the hydroxyl groups on the repeating glucose units are converted into ethyl ether groups. The number of ethyl ether groups can vary. The number of ethyl ether groups is characterized by the "percent ethoxyl substitution." The percent ethoxyl substitution is based on the weight of the substituted product and determined according to a Zeisel gas chromatographic technique as described in ASTM D4794-94 (2003). The ethoxyl substitution (also called "ethyl ether content") is from 10-55%.

As used herein, the viscosity of an ethylcellulose polymer is the viscosity of a 5 weight percent solution of that ethylcellulose polymer in a solvent, based on the weight of the solution. The solvent is a mixture of 80% toluene and 20% ethanol by weight. The viscosity of the solution is measured at 25° C. in an Ubbelohde viscometer.

A "polymer," as used herein is a relatively large molecule made up of the reaction products of smaller chemical repeat units. Polymers have weight-average molecular weight of 2,000 daltons or higher.

The softening point of a material is the temperature below which the material behaves as a solid and above which it begins to be capable of flow under mild to moderate stress. Softening point is measured by the ring and ball method according to ASTM E28-14.

An ionic group is a chemical group, which may be a portion of a molecule, for which there is one or more value of pH between 4 and 12 at which, when plural ionic groups are in contact with water at that pH, 50 mole percent or more of the ionic groups will be in an ionized state.

As used herein, an oil is a material that has melting point of 35° C. or less and that has one or more carbon atom per molecule. An oil has no ionic group. An oil has no chemical group of the structure —($-CH_2CH_2-O-$)$_n$— where n is 2 or more. One category of oils is triglycerides, which are triesters of fatty acids with glycerol. Food oils are oils routinely consumed by human beings. Vegetable oils are triglycerides extracted from plants.

As used herein, the term "oleogel" refers to a mixture that contains one or more oil and one or more ethylcellulose polymer that is solid at 25° C. Oleogel may contain additional ingredients such as stearic acid. The oleogel may be a relatively hard solid or a relatively soft solid. A cube of oleogel of height 2 cm, placed on a flat surface at 25° C., will resist collapsing under its own weight to the extent that the height after 1 minute will be 1 cm or higher.

Dough is a thick, malleable paste made from flour mixed with a relatively small amount of water. The amount of water by weight based on the weight of flour is 100% or less. Dough optionally contains one or more ingredients in addition to flour and water. The sum of the amount of flour plus the amount of water is, by weight based on the weight of the dough, 80% or more. Flour is made by grinding one or more cereal grains.

As used herein, a glyceride is a mono-, di-, or tri-ester of glycerol. A glyceride has the structure I:

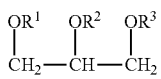

Each of $R^1$, $R^2$, and $R^3$ is independently either hydrogen or an organic group. One or more of $R^1$, $R^2$, and $R^3$ is a residue of a carboxylic acid. A residue of a carboxylic acid has the structure $—C(O)—R^4$, where $—R^4$ is an organic group, and the carbonyl carbon is attached to a carbon atom in $—R^4$. A fatty acid has the structure $HOC(O)—R^5$, where $—R^5$ is an aliphatic group containing 6 or more carbon atoms, and the carbonyl carbon is attached to a carbon atom in $—R^5$.

The firmness of a composition is measured using a TA.XT plus texture analyzer at 23° C. suing a 13 mm immersion depth and cell force of 5 kgf in back extrusion mode. Firmness is measured in newtons (N).

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when a ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

Any ethylcellulose polymer may be used in the composition of the present invention. The ethoxyl substitution content of the ethylcellulose polymer is preferably 10% or more; more preferably 30% or more; more preferably 40% or more; preferably 45% or more; more preferably 48% or more. The ethoxyl substitution content of the ethylcellulose polymer is preferably 55% or less; more preferably 53% or less; more preferably 52% or less; more preferably 51% or less; more preferably 50% or less.

The ethylcellulose polymer preferably has viscosity of 2 mPa·s or higher; more preferably 5 mPa·s or higher; more preferably 12 mPa·s or higher; more preferably 16 mPa·s or higher. The ethylcellulose polymer preferably has viscosity of 5000 mPa·s or lower; more preferably 2000 mPa·s or lower; more preferably 1000 mPa·s or lower; more preferably 500 mPa·s or lower; more preferably 350 mPa·s or lower; more preferably 250 mPa·s or lower; more preferably 125 mPa·s or lower.

The ethylcellulose polymer has softening point of 100° C. or higher; preferably 120° C. or higher; more preferably 130° C. or higher. The ethylcellulose polymer preferably has softening point of 160° C. or lower; more preferably 150° C. or lower; more preferably 140° C. or lower.

Commercially available forms of ethylcellulose polymer which may be used in the invention include, for example, those available under the name ETHOCEL™, from The Dow Chemical Company, including, for example, ETHOCEL™ Standard 4, ETHOCEL™ Standard 7, ETHOCEL™ Standard 10, ETHOCEL™ Standard 20, ETHOCEL™ Standard 45, or ETHOCEL™ Standard 100 with ethoxyl substitution content from 48.0 to 49.5%. Other commercially available ethylcellulose polymers useful in embodiments of the invention include certain grades of AQUALON™ ETHYLCELLULOSE, available from Ashland, Inc., and certain grades of ASHACEL™ ethylcellulose polymers, available from Asha Cellulose Pvt. Ltd.

Preferably the amount of ethylcellulose polymer in the composition of the present invention is, by weight based on the weight of the composition, 0.6% or more; more preferably 0.8% or more; more preferably 1% or more; more preferably 1.2% or more. Preferably the amount of ethylcellulose polymer in the composition is, by weight based on the weight of the oleogel, 12% or less; more preferably 10% or less; more preferably 8% or less; more preferably 6% or less.

The composition of the present invention contains stearic acid. Preferably, the amount of stearic acid in the composition is, by weight based on the weight of the composition, 0.8% or more; more preferably 1.2% or more; more preferably 1.6% or more. Preferably, the amount of stearic acid in the composition is, by weight based on the weight of the composition, 10% or less; more preferably 8% or less; more preferably 6% or less; more preferably 4% or less.

The composition of the present invention contains one or more unsaturated oils. Preferred unsaturated oils are food oils. Preferred food oils are vegetable oils. Preferred vegetable oils are cottonseed oil, peanut oil, coconut oil, linseed oil, palm kernel oil, rapeseed oil (also known as canola oil), palm oil, sunflower oil, and mixtures thereof. Preferred vegetable oils are extracted from plant sources and have not been hydrogenated or modified by other chemical reaction. Preferred unsaturated oils are triglycerides.

Preferably the amount of unsaturated oil in the composition is, by weight based on the weight of the composition, 15% or more; more preferably 25% or more; more preferably 35% or more; more preferably 40% or more. Preferably the amount of unsaturated oil in the composition is, by weight based on the weight of the composition, 99% or less; more preferably 90% or less; more preferably 75% or less; more preferably 65% or less.

The composition of the present invention optionally contains one or more saturated fats. Preferably the amount of saturated fat in the composition is, by weight based on the weight of the composition, 0% or more; more preferably 5% or more; more preferably 10% or more; more preferably 15% or more. Preferably the amount of saturated fat in the composition is, by weight based on the weight of the composition, 70% or less; more preferably 50% or less; more preferably 40% or less; more preferably 30% or less.

In the composition of the present invention, preferably the weight ratio of unsaturated oil to saturated fat is 5:1 or less; more preferably 4:1 or less; more preferably 3:1 or less. In the composition of the present invention, preferably the weight ratio of unsaturated oil to saturated fat is 0.5:1 or higher; more preferably 1:1 or higher; more preferably 1.5:1 or higher.

Preferably, the amount of unsaturated oils plus the amount of saturated fats is, by weight based on the weight of the composition, 45% or more; more preferably 55% or more; more preferably 65% or more. Preferably, the amount of unsaturated oils plus the amount of saturated fats is, by weight based on the weight of the composition, 99% or less; more preferably 95% or less; more preferably 85% or less.

Preferably, the composition of the present invention additionally contains water. Preferably the amount of water is, by weight based on the weight of the composition, is 4% or more; more preferably 8% or more; more preferably 12% or more. Preferably the amount of water is, by weight based on the weight of the composition, is 50% or less; more preferably 40% or less; more preferably 30% or less; more preferably 20% or less.

Preferably, the amount of ethylcellulose polymers plus the amount of stearic acid plus the amount of unsaturated oils plus the amount of saturated fats plus the amount of water is, by weight based on the weight of the composition, 80% or more; more preferably 85% or more; more preferably 90% or more; more preferably 95% or more.

The composition of the present invention may additionally contain one or more additional ingredients. Typical additional ingredients include, for example, lecithin, monoglycerides, diglycerides, milk solids, sodium chloride, sodium benzoate, potassium sorbate, and mixtures thereof.

Preferably the composition of the present invention is solid at 23° C. Specifically, if a cube of the composition of the present invention having 2.54 cm length per side is formed at 23° C., if the cube is allowed to rest on a horizontal surface at 23° C. for 10 minutes, the height of the cube will remain at 2 cm or higher. Preferably the firmness of the composition of the present invention is 6 N or higher. Preferably, the firmness of the composition of the present invention is 35 N or lower.

The composition of the present invention may be used for any purpose. One suitable use is as a substitute for margarine. For example, the composition of the present invention may substitute for margarine in situations where the margarine is used by itself, such as spreading the margarine on a substrate such as, for example, bread. For another example, the composition of the present invention may substitute for margarine in situations where the margarine is mixed with other ingredients.

One preferred use for the present invention is to incorporate the composition of the present invention into a pastry composition. A pastry composition is a composition that contains flour and that also contains butter, margarine, shortening, a composition of the present invention, or a mixture thereof. Preferred flours are made from corn, rice, wheat, barley, sorghum, millet, oats, rye, triticale, buckwheat, fonio, quinoa, and combinations thereof; more preferred is wheat.

A preferred type pastry is puff pastry. Puff pastry is made by mixing dough and a composition of the present invention.

Dough contains flour, water, and optionally other ingredients. Preferably the sum of the amounts of flour and water, by weight based on the weight of the dough, is 80% or more; more preferably 85% or more; more preferably 90% or more. Dough preferably contains saturated fat or unsaturated oil or a combination thereof. Preferably sum of the amount of unsaturated oil and the amount of saturated fat is, by weight based on the weight of the dough, 15% or less; more preferably 10% or less.

Preferred dough contains wheat flour. Preferably the amount of flour in dough is, by weight based on the weight of the dough, 25% or more; more preferably 40% or more. Preferably the amount of flour in dough is, by weight based on the weight of the dough, 75% or less; more preferably 65% or less. Preferably the amount of water in dough is, by weight based on the weight of the dough, 10% or more; more preferably 20% or more; more preferably 30% or more. Preferably the amount of water in dough is, by weight based on the weight of the dough, 55% or less; more preferably 45% or less. Preferably the amount of water plus the amount of flour in the dough is, by weight based on the weight of the dough, 75% or more; more preferably 85% or more. Preferably the amount of water plus the amount of flour in the dough is, by weight based on the weight of the dough, 98% or less; more preferably 96% or less. Preferred ingredients in dough other than flour and water are one or more of butter, margarine, the composition of the present invention, sodium chloride, and mixtures thereof.

A preferred type of pastry composition that contains the composition of the present invention is puff pastry. Puff pastry is a pastry composition that is made by a process that contains the following steps. A structure (i) is formed that contains layers. Each layer is planar; that is, each layer is flat and has one dimension that is smaller than each of the other two dimensions by a factor of 5 or more. The layers are parallel to each other. The small dimension defines the "vertical" direction, and the layers are referred to as "horizontal" regardless of their orientation with respect to gravity. Structure (i) contains a top layer that contains dough; an intermediate layer that contains butter, margarine, shortening, the composition of the present invention, or a mixture thereof (preferably containing a composition of the present invention); and a bottom layer that contains dough. Then structure (i) is subjected to a force in the vertical direction that compresses structure (i) to form compressed structure (ii). The force may be applied mechanically by any method. For example, the bottom layer of structure (i) may rest against a flat surface and then a roller or a flat plate or other object may be pushed against the top layer of structure (i). Then structure (ii) is preferably folded one or more times to form a structure (iii) that has two or more horizontal layers, where each of the horizontal layers of structure (iii) contains a portion of structure (ii). Preferably structure (iii) is then compressed to form a compressed structure (iv). Preferably, the sequence of folding and compressing is repeated one or more additional times. Preferably, the pastry composition is then baked in an oven. Preferably, the temperature of the oven during baking is 125° C. or higher; more preferably 150° C. or higher; more preferably 175° C. or higher. Preferably, the temperature of the oven during baking is 250° C. or lower; more preferably 225° C. or lower; more preferably 210° C. or lower. Preferably, the baking time in the oven is 5 minutes or longer; more preferably 10 minutes or longer. Preferably, the baking time in the oven is 30 minutes or less; more preferably 25 minutes or less; more preferably 20 minutes or less.

Among pastry compositions, preferred are those that contain, after baking, ethylcellulose polymer in an amount, by weight based on the pastry composition after baking, 0.2% or more; more preferably 0.4% or more; more preferably 0.6% or more. Among pastry compositions, preferred are those that contain, after baking, ethylcellulose polymer in an amount, by weight based on the pastry composition after baking, 2% or less; more preferably 3% or less; more preferably 2% or less; more preferably 1% or less.

Among pastry compositions, preferred are those that contain, after baking, stearic acid in an amount, by weight based on the pastry composition after baking, 0.25% or more; more preferably 0.5% or more; more preferably 0.75% or more; more preferably 1% or more. Among pastry compositions, preferred are those that contain, after baking, stearic acid in an amount, by weight based on the pastry composition after baking, 3.5% or less; more preferably 2.5% or less; more preferably 1.5% or less.

Among pastry compositions, preferred are those that contain, after baking, flour in an amount, by weight based on the pastry composition after baking, 20% or more; more preferably 30% or more; more preferably 40% or more. Among pastry compositions, preferred are those that contain, after baking, flour in an amount, by weight based on the pastry composition after baking, 75% or less; more preferably 65% or less; more preferably 55% or less.

Among pastry compositions, preferred are those that contain, after baking, water in an amount, by weight based on the pastry composition after baking, 0 to 10%; more preferably 0 to 5%.

Among pastry compositions, preferred are those that contain, after baking, saturated fat in an amount, by weight based on the pastry composition after baking, 3.5% or more; more preferably 8% or more; more preferably 12% or more. Among pastry compositions, preferred are those that contain, after baking, saturated fat in an amount, by weight based on the pastry composition after baking, 45% or less; more preferably 35% or less; more preferably 25% or less.

Among pastry compositions, preferred are those that contain, after baking, unsaturated oil in an amount, by weight based on the pastry composition after baking, 10% or more; more preferably 15% or more; more preferably 20% or more. Among pastry compositions, preferred are those that contain, after baking, unsaturated oil in an amount, by weight based on the pastry composition after baking, 60% or less; more preferably 50% or less; more preferably 40% or less.

Among pastry compositions, preferred are those that contain, after baking, the sum of the amounts of flour, saturated fat, and unsaturated oil, by weight based on the pastry composition after baking, 80% or more; more preferably 85% or more; more preferably 90% or more.

The following are examples of the present invention.

Ingredients used were as follows:

margarine hardstock=by weight, 80% saturated fat, 17% monounsaturated oil, and 3% polyunsaturated oil, obtained from Loders Croklaan NFDM=nonfat dry milk Oil-1=Omega 9 Canola Oil EC-1=ETHOCEL™ Std. 45 ethylcellulose polymer from Dow Chemical Co.; has ethoxyl content of 48.0-49.5% and viscosity of 41-49 mPa*s.

SA=stearic acid

PREPARATIVE EXAMPLE 1: OLEOGEL

The ingredients for the oleogel were as follows:

| | |
|---|---|
| Oil-1 | 88% by weight |
| EC-1 | 5% by weight |
| SA | 7% by weight |

The oleogel was prepared as follows: EC-1 (545 g) and canola oil (4,906 g) were placed in a 7.57 liter (two gallon) jacketed glass reactor under nitrogen blanket. The mixture was heated to 155° C. over 200 minutes while stirring at 200 rpm with dual-tier 7.62 cm (3 inch) A320 impellers attached to an overhead stirring motor and held at that temperature for 35 minutes under continuous stirring at 350 rpm. At the end of the holding time, the heater was turned off and the mixture was cooled to 130° C. while stirring at 100 rpm. When the temperature reached 130° C., the liquid mixture was drained to three nitrogen-purged metal cans, and these were allowed to cool to room temperature (approximately 23° C.) and form gel.

PREPARATIVE EXAMPLE 2: FAT PHASE

A fat phase was made by combining the following ingredients:

| ingredient | weight % of fat phase |
|---|---|
| margarine hardstock | 99.3 |
| lecithin | 0.2 |
| mixture of mono- and diglycerides | 0.5 |

PREPARATIVE EXAMPLE 3: WATER PHASE

A water phase was made by combining the following ingredients:

| ingredient | weight % of water phase |
|---|---|
| NFDM | 5 |
| sodium chloride | 10 |
| potassium sorbate | 0.5 |
| sodium benzoate | 0.5 |
| water | 84 |

EXAMPLE 4C AND 5: MARGARINE-STYLE FORMULATIONS

A comparative margarine (Ex. 3C) and inventive example margarine replacement (Ex. 3) were made, using an Armfield scrape surface heat exchanger. Ingredients were as follows. The amounts shown are parts by weight.

| ingredient | Comparative Ex. 4C | Example 5 |
|---|---|---|
| Oleogel (Preparative Example 1) | 0.00 | 5.76 |
| Oil-1 | 4.48 | 4.48 |
| fat phase (Preparative Example 2) | 11.52 | 5.76 |
| water phase (Preparative Example 3) | 4.00 | 4.00 |
| total | 20.00 | 20.00 |

The formulation of Example 5 was made by three different methods. During the mixing process, oleogel was heated to various temperatures, as follows. Multiple samples of each method were made. Firmness was tested using a Texture Analyzer TA.Xtplus with back extrusion mode was used to determine the firmness of the oil gels. Oil gel samples were filled to 2.5 cm depth in a crystallizing dish with an inner diameter of 9.1 cm. The samples were then cooled to room temperature overnight prior to the texture measurements. A syringe with inner diameter of 2 mm was placed into the gel. Round compression probe was placed in the middle of the syringe to measure the firmness of the gel. The back extrusion measurement was set up to have 13 mm immersion depth and measuring cell force of 5 kg. Results were as follows:

| Example | Heating temperature | Average Firmness |
|---|---|---|
| 5-70 | 70° C. | 9.7 N |
| 5-80 | 80° C. | 9.6 N |
| 5-145 | 145° C. | 14.6 N |

Example 5-145 was repeated (Example 5-245R), and the firmness was compared to the firmness of the control sample Comparative Example 4C, with the following results:

| Example | Average Firmness |
|---|---|
| Comparative 4C | 28.0 N |
| Example 5-145R | 14.2 N |

All of the example compositions had acceptable firmness. Example 5-145 had the most desirable firmness.

PREPARATIVE EXAMPLE 6: DOUGH

Dough was made by mixing the following ingredients, in % by weight. The bread flour and cake flour are both wheat flours.

| | |
|---|---|
| bread flour | 44.91% |
| cake flour | 10.36% |
| butter | 6.89% |
| water | 36.56% |
| salt | 1.29% |

EXAMPLE 7: PUFF PASTRY

Puff pastry was made as follows. The "roll-in" was either margarine (comparative example 4C) or inventive margarine substitute (Example 5-80). Puff pastry was prepared as follows.

Countertop was floured and then the roll-in samples were rolled into a square shape with the thickness of 0.952 cm to 1.27 cm (0.375 to 0.5 inch) with a rolling pin. The samples then were placed in the refrigerator (approximately 2° C.) for 30 minutes to firm up. Ratio of dough to roll-in was as follows: (60:40) 600 g dough/400 g roll-in.

The dough was rolled to form a flat a rectangle with a thickness of 10-13 mm dough layer. The roll-in composition was placed on one half of the dough with just enough of the dough showing around the roll-in composition edged to pinch when folded. The second half of dough was folded over the roll-in composition and the edges of the dough were pinched (sealed) around the roll-in composition to form a sandwiched article. The resulting sandwiched article was rolled to a thickness of 10-13 mm while maintaining a rectangular shape. The left and right sides were folded in to meet at the center. The sides were folded on top of one another along the center line as if closing a book. The resulting composition was refrigerated at approximately 4° C. for 30 minutes. The composition was turned 90 degrees and rolled into a rectangle 10-13 mm thick. The halves were folded to the center and then on top of one another as before and refrigerated for 30 minutes. This process of folding, refrigerating and rolling out was repeated for three times.

After the third roll out and fold over, the dough samples were placed in the refrigerator for about 30 minutes. After that, the samples were taken out of the refrigerator, rolled out for the last time and then cut 10 cm by 12 cm rectangles. The cut dough pieces placed on a baking tray and rested in the refrigerator at approximately 4° C. for about 30 minutes. After resting period at approximately 23° C., the pieces were baked in a convection oven at 190° C. (375° F.) for 16 minutes.

After baking, the pastries had the following overall composition, in weight % based on the weight of the pastry after baking:

| | Roll-in Composition | |
|---|---|---|
| | Comparative 4C | Example 5-80 |
| water | 0 | 0 |
| flour | 46.48 | 46.48 |
| saturated fat | 31.45 | 18.62 |
| salt | 2.20 | 2.20 |
| unsaturated oil | 18.97 | 29.98 |
| lecithin | 0.06 | 0.03 |
| mono- and diglycerides | 0.16 | 0.08 |
| NFDM | 0.56 | 0.56 |
| potassium sorbate | 0.06 | 0.06 |
| sodium benzoate | 0.06 | 0.06 |
| EC-1 | 0 | 0.81 |
| stearic acid | 0 | 1.13 |

The puff pastry made using Example 5-80 appeared identical to the puff pastry made using Comparative Example 4C. This result demonstrates that the inventive composition yields a pastry that has a reduction of saturated fat of 41% over the comparative pastry while achieving equivalent pastry quality.

The invention claimed is:

1. A composition that is solid at 23° C. comprising, by weight based on the weight of the composition,
   (a) 0.4% to 12% ethylcellulose polymer;
   (b) 0.5% to 8% stearic acid;
   (c) 15% to 90% unsaturated oil; and
   (d) 6% to 70% saturated fat,
   wherein components (a), (b) and (c) form oleogel.

2. The composition of claim 1, additionally comprising, by weight based on the weight of the composition,
   (e) 4% to 50% water.

3. The composition of claim 1, wherein firmness of the composition is 6 to 35 Newtons, as measured by a TA.XT plus texture analyzer at 23° C. using 13 mm immersion depth and cell force of 5 kgf in back extrusion mode.

* * * * *